US006774905B2

(12) United States Patent
Elfving et al.

(10) Patent No.: US 6,774,905 B2
(45) Date of Patent: Aug. 10, 2004

(54) IMAGE DATA PROCESSING

(75) Inventors: Mats Elfving, Lund (SE); Christian Merheim, Helsingborg (SE); Andreas Rodman, Helsingborg (SE)

(73) Assignee: Wespot AB, Lund (SE)

(*) Notice: Subject to any disclaimer, the term of this patent is extended or adjusted under 35 U.S.C. 154(b) by 205 days.

(21) Appl. No.: 09/746,777

(22) Filed: Dec. 22, 2000

(65) Prior Publication Data

US 2003/0043160 A1 Mar. 6, 2003

Related U.S. Application Data

(60) Provisional application No. 60/177,308, filed on Jan. 21, 2000.

(51) Int. Cl.[7] .................................................. G09G 5/00
(52) U.S. Cl. ........................ 345/581; 345/421; 345/441; 345/427; 345/620; 348/154; 348/159
(58) Field of Search ................................ 348/154, 159; 345/441, 581, 419, 421, 422, 427, 428, 506, 620, 627

(56) References Cited

U.S. PATENT DOCUMENTS

| 5,555,512 A | 9/1996 | Imai et al. |
| 5,666,157 A | 9/1997 | Aviv |
| 5,847,755 A | 12/1998 | Wixson et al. |
| 5,963,272 A | 10/1999 | Wixson |

FOREIGN PATENT DOCUMENTS

| EP | 0090395 | 10/1983 |
| EP | 0445334 | 9/1991 |
| EP | 0805425 | 11/1997 |
| EP | 0986036 | 3/2000 |
| GB | 2282294 | 3/1995 |
| WO | WO 9828706 | 7/1998 |

OTHER PUBLICATIONS

Patent Abstracts of Japan, Publication No. 06–223190, Dec. 8, 1994.
Patent Abstracts of Japan, Publication No. 09–050525, Dec. 8, 1994.
Gian Luca Forest, *Object Recognition and Tracking for Remote Video Surveillance*, IEEE Transactions on Circuits and Systems for Video Technology, vol. 9, No. 7, Oct. 1999, pp. 1045 through 1062.
Michael Meyer, et al., *A New System for Video–Based Detection of Moving Objects and its Integration into Digital Networks*, Security Technology, 1996, 30th Annual 1996 International Carnahan Conference, pp. 105 through 110.
Elena Stringa, et al., *Content–based Retrieval and Real Time Detection from Video Sequences Acquired by Surveillance Systems*, 1998 IEEE, pp. 138 through 142.
English language Abstract of European Patent Publication No. 0445334 (Sep. 11, 1991).

Primary Examiner—Mark Zimmerman
Assistant Examiner—Kimbinh T. Nguyen
(74) Attorney, Agent, or Firm—Birch, Stewart, Kolasch & Birch, LLP

(57) ABSTRACT

A method and a device for managing image information in a monitoring system. The monitoring system comprises at least one monitoring module (1) for monitoring a monitored location and a remote recipient unit (3). The method comprises the steps of recording an image of the monitored location with the monitoring module (1), segmenting out a distinct region by comparing the recorded image with a reference image in the monitoring module (1), creating an outline shape in the monitoring module which represents the edge of the distinct region, transmitting data which represents the outline shape to the recipient unit (3), recreating the outline shape in the recipient unit by means of said transmitted data, and displaying the outline shape visually in the recipient unit.

26 Claims, 12 Drawing Sheets

IMAGE DATA PROCESSING

CROSS REFERENCE TO RELATED APPLICATION

This application claims the benefit of U.S. Provisional Application No. 60/177,308, filed Jan. 21, 2000.

FIELD OF THE INVENTION

This invention relates to a method and a device for managing image information in a monitoring system, in which the management of image information comprises both processing of image information and transmission of processed image information. The invention also relates to a monitoring module and a computer program product.

BACKGROUND ART

Monitoring of various public places, installations and premises is becoming increasingly important as they contain increasingly valuable equipment such as, for example, computers which in turn contain information that is very important to the owner, and perhaps also confidential. There is also a need for monitoring, for example, of baggage at airports and also in private dwellings. It is normally desirable for the monitoring information to be displayed immediately and accurately in order to enable the appropriate measures to be taken quickly.

In order to meet these needs, there are different types of monitoring systems. One type of monitoring system according to prior art technique normally comprises a monitoring center and a number of monitoring modules. Each monitoring module is connected to the monitoring center via communication cables. A monitoring module can comprise a video camera and an infrared detector which are connected to each other via a cable. It operates by the infrared detector detecting a movement and the video camera recording an image. The recorded image is then sent to the monitoring center. A problem with infrared detectors is that they are relatively easy to mislead, which makes the monitoring unreliable. For example, a sheet of glass can be placed in front of the detector, which means that heat changes are not detected and the video camera will not start recording. A further problem with this type of monitoring system is that in many cases the recorded images do not provide sufficient information about what caused the alarm. This can occur when, for example, alarm situations which have been caused by high temperatures or sabotage are not caught by the camera. As a result, there remains uncertainty as to whether it is a genuine alarm.

In order to solve this problem, it has been proposed that images should be recorded continually. The recorded image can be compared with a reference image, which is normally a background image of the area which is being monitored. If there is any difference between these images and if a change has occurred in a recorded image, these images are transmitted to a manned monitoring center. A system operator at the monitoring center looks at the transmitted image and from that makes a decision regarding the monitoring situation. A number of situations which the infrared detector would not detect will be detected by this method. A disadvantage of this technique is that a lot of information must be transmitted, as there are many situations, such as changes in lighting conditions, which can cause changes in the recorded image. It takes a long time to transmit the image. Before the transmission is carried out, the image or images are compressed using, for example, JPEG or MPEG. A transmission, which is a video transmission of consecutive images of the monitoring site, is limited to a certain number of images per second. If a mobile telephone of the GSM type with a transmission speed of 9.6 kbit/s is used as the receiver for the monitoring information, it can take 20–100 seconds before the transmitted image becomes clear and decipherable. By means of compression of the images, it is possible to reduce this to 3–4 seconds per image. If there is further compression, the image becomes so unclear that events become difficult or even impossible to make out. This means that if the degree of compression is increased in order to reduce the bandwidth, the image quality finally becomes so poor that it is not possible to draw the correct conclusions from the image. As an alternative, the image frequency can be reduced and fewer images sent. However, this does not provide satisfactory monitoring, as much can happen between two consecutive images and here too it can be difficult to draw conclusions about actual movements. Problems also arise when it is wished to store monitoring information in the monitoring module. In order to be able to store all the information which is needed to determine whether there is an alarm situation, a large storage capacity is required, which results in the equipment being expensive and its complexity increasing.

Patent application WO 98/28706 describes a security system which comprises a number of cameras which are arranged to record images and to transmit these images to a monitoring station in which digital image processing is carried out. The monitoring station carries out processing to determine whether there is an alarm situation or not, and if there is an alarm situation a signal is forwarded indicating whether it is a human-related alarm or an unknown alarm.

U.S. Pat. No. 5,666,157 describes a monitoring system which detects unusual events, which can be movements which are interpreted as personal attacks. Recorded images are analyzed, objects are detected and the movement characteristics of the object are calculated. Based on the movement characteristics, a decision is reached which indicates to what extent a movement is judged to have a criminal intention.

SUMMARY OF THE INVENTION

An object of the invention is therefore to make possible reliable and cost-effective monitoring.

This and other objects which will be apparent from the following description are achieved by a method for managing image information in a monitoring system, which monitoring system comprises at least one monitoring module for monitoring a monitored location and a remote recipient unit, comprising the steps of recording an image of the monitored location by means of the monitoring module, segmenting a distinct region in the monitoring module by comparing the recorded image with a reference image, creating an outline shape in the monitoring module which represents the edge of the distinct region, transmitting data which represents the outline shape to the recipient unit, recreating the outline shape in the recipient unit by means of the said transmitted data, and displaying the outline shape visually in the recipient unit.

The monitoring module can continually record images of the monitored location. The monitored location is limited among other things by the components of the monitoring module for recording images. If a change has occurred in a recorded image in comparison to a reference image, such as a person or an animal having entered the image, this object is segmented by means of a number of different algorithms.

The reference image is created with one or more algorithms from one or more previous images, one or more background images of the monitored location or a combination of both. The advantage of the comparison is that moving objects can be processed further and stationary objects, such as tables and chairs, which are in the monitored location can be excluded. This means that a distinct region contains interesting information about events in the monitored location. An object which is segmented from an image is represented by this distinct region.

An outline shape is created. An outline shape is a stylized representation of the edge of the distinct region. Data representing this outline shape occupies little bandwidth and is therefore suitable for transmission. The recipient unit is the unit which receives data representing the outline shape and processes it in an appropriate way. The monitoring module and the recipient unit interpret the transmitted information in the same way. They have the same mathematical model of the outline shape. That is to say that the monitoring module processes the outline shape in accordance with a mathematical model and produces data representing the outline shape and transmits this data to the recipient unit. The recipient unit which receives the data can, if so required, have knowledge of which mathematical model is used and can recreate the outline shape for visual display. The recipient unit can, for example, be located in a manned monitoring station so that the outline shape is displayed on a screen to an operator. The operator makes a decision regarding whether it is an alarm situation and can then take appropriate measures.

A great advantage of transmitting the outline shape of an object is that, if the object is a person, its privacy is preserved. This can be very important, as special permission is often required to erect monitoring cameras, precisely in order to protect personal privacy. In addition, it should be possible to use the technique in private homes and it can then be desirable for the people who live in homes with monitoring devices not to be recorded on video or photographed, as, for example, these pictures could be misused.

In one embodiment, the step of creating an outline shape comprises the steps of creating an outline image of the distinct region and of fitting the outline shape to the outline image.

The outline image can consist of a sequence of points along the edge of the distinct region. An advantage of using the outline image is that it is easy to produce the outline shape in this way.

In another embodiment, the step of creating the outline image comprises the step of following the edge of the distinct region with a search function, such as a clock-hand algorithm.

The outline image is extracted in this way from around the region. Following this, a shape is fitted mathematically to the sequence of points in the outline image.

An embodiment comprises the steps of classifying the distinct region in the monitoring module from at least one characteristic of the distinct region, such as size and/or shape, the classification controlling the transmission of said data.

Dependent upon the classification of the distinct region, it is determined whether it is of interest for forwarding to the recipient unit. It can, for example, be the case that an area is monitored and that the area is also guarded by a dog. Data concerning the outline shape of the dog is thus not to be forwarded.

An embodiment further comprises the step of comparing in the monitoring module particular characteristics belonging to the distinct region, such as one or more characteristics of the type: size and shape, with corresponding characteristics belonging to a region segmented from at least one previously recorded image, the associated movement history of the distinct region being recorded if the characteristics conform to the extent that they are determined to represent the same object. The recording thus takes place by matching with the distinct regions of previously recorded objects. Two distinct regions recorded at different times are said to represent the same object if they meet certain predetermined matching criteria. For example, characteristics of the distinct region can be compared, such as its physical size in the image, and if they correspond to a particular extent it is determined that it matches. In this way, a movement history of a distinct region can be produced. For example, the speed and direction of movement can be worked out.

Another embodiment further comprises the steps of classifying the distinct region in the monitoring module based on the recorded movement history of the distinct region, the classification controlling the transmission of said data. The movement information is classified in order to determine whether the distinct region is an alarm object or not. If the distinct region is classified as an alarm object, the outline shape is to be transmitted to the recipient unit. The classification can, for example, be carried out based on how quickly an object moves or the direction of movement of the object. For example, if an object moves short distances back and forth, it can be a tree or a curtain blowing in the wind. These movements are thus not to be classified as alarm objects. In this way the number of false alarms is reduced. In addition, the amount of transmitted information is further reduced.

An embodiment further comprises the steps of classifying the distinct region in the monitoring module based on at least one characteristic belonging to the distinct region, such as size, shape and/or recorded movement history, the classification controlling the transmission of said data.

In one embodiment, data representing the movement history is transmitted to the recipient unit together with said data representing outline shape and is recreated for visual display.

The visual display can, for example, be carried out by consecutive outline shapes being combined into a moving sequence. This sequence can be combined either in the monitoring module or in the recipient unit. By having the ability to display the movement history of the outline shape which reflects the behavior of the transmitted object, an operator can, for example, more easily make an evaluation concerning the alarm situation. The transmission of the movement history only needs to involve a very small increase in the amount of data transmitted. While privacy protection is retained, it is possible to have reliable monitoring, as it is a person's shape, as shown by the outline, and pattern of movement which are important when someone is to draw a conclusion based on a visual display as to whether there is an alarm situation or not. The movement history can, for example, also be represented by a movement vector showing the direction of movement of the object and its speed.

In one embodiment, said data is transmitted only if the distinct region is classified as human-related.

This makes possible, for example, burglary monitoring. The data which is transmitted can be displayed visually at a recipient unit and an evaluation of the human-related outline shape can be carried out. For example, it can be decided whether the outline shape is an actual alarm object, based on where on the monitored location the outline shape is located. For example, at one side of the monitored location there can be a road where people can pass by without causing an alarm situation. If the movement information is also transmitted, the behavior of the object can form the basis for a visual evaluation of whether there is an alarm situation. The method according to the invention is particularly suited to monitoring people, as it provides privacy.

Another embodiment further comprises the step of storing the data which is to be transmitted to the recipient unit in the monitoring module prior to transmission.

The outline shape requires little storage space and can therefore be stored in a memory in the monitoring module. As this storage does not require much space, the cost of the monitoring module is reduced. The possibility of storage in a memory in the monitoring module is a great advantage if, for example, a fault arises in the recipient unit or in the communication between the monitoring module and the recipient unit or if the recipient unit becomes overloaded, as the outline shape can be sent at a later time when the function is restored. If there is a system operator, he can also be allowed to retrieve the outline shape from the monitoring module for analysis afterwards, if, for example, transmission is not possible. There can be several monitoring modules which cooperate to store the information. For example, if the movement history is to be transmitted, this can also be stored before transmission.

One more embodiment further comprises the step of transmitting supplementary monitoring information, such as audio recording, partial lines and intensity area within the distinct region, to the recipient unit.

An advantage of this is, for example, that the operator can request more information if he finds it difficult to make a decision based on the information which has already been displayed. The supplementary monitoring information can consist, for example, of one or a few images of the distinct region. This supplementary information can be transmitted as a bit-map image. This means that the area that is of interest is segmented out and the image of this interesting area is transmitted. The supplementary monitoring information can also be a sound recording. Another type of supplementary monitoring information can be intensity areas within the distinct region. When this data representing these intensity areas is transmitted, characteristic features within the distinct region are displayed. For example, a division of a person can be carried out into four intensity areas, hair, face, upper body and trousers/lower body. A further type of supplementary monitoring information can be so-called partial lines within the distinct region. The partial line content gives the distinct region more structure and essential information about the texture of the object. Examples of partial lines in a person can be that a chin portion is added so that the head is regarded as part of the rest of the body. It is easier to make out what the outline shape represents.

The system operator can have the ability to increase the amount of supplementary monitoring information at the expense of the bandwidth. An embodiment further comprises the step of displaying the recreated outline shape on a background image in the recipient unit. The background image can be recorded initially when the monitoring module is started up and transmitted to the recipient unit. If required, it can be possible for the alarm operator, for example, to request an update. By sending the background image of the monitored location once to the recipient unit and then only sending the outline shape, the feature is retained that the amount of data sent from the monitoring module to the recipient unit remains small, while at the same time the visual evaluation of the displayed data by an alarm operator is made easier, as the alarm operator has now something as a point of reference for the outline shape and also any movement history.

In one embodiment, the communication between the monitoring module and the recipient unit is carried out by wireless means, for example by mobile telephony.

Wireless transmission makes possible mobility of the recipient unit. This means that if an operator has a recipient unit, the operator does not need to remain stationary. For example, the outline shape can be received by a recipient unit which is arranged in a mobile phone.

In one embodiment, the outline shape is represented by a polygon.

An advantage of using a polygon function is that compression algorithms can be used effectively. A polygon is also good when an alarm operator is to make a visual evaluation of the outline shape.

In one embodiment, the polygon is represented by a number of points, the number of which is variable. By using a smaller number of points, a lower bandwidth is required, but at the same time the quality of the outline shape deteriorates. Other outline shapes can also have similar characteristics. It is a great advantage to be able to select the number of points in the polygon, as the access to bandwidth and required image quality can vary from occasion to occasion and from monitoring module to monitoring module. For example, certain premises which contain very valuable equipment can require extra high verification quality and a larger number of points is then selected to be used for the polygon. There can also be various types of problems which, for example, can cause reduced function in the recipient unit and which at the same time are set against high performance requirements, which means that the bandwidth must be reduced in order that the recipient unit is not to be overloaded. The number of points can then be reduced.

In one embodiment, the outline shape is represented by a spline function.

A spline curve is a curve which is controlled by a number of control points. The position of the control points is adjusted so that the curve coincides as well as possible with the outline in the image. This curve has the advantage of being good for visual evaluation of an alarm situation for the outline shape.

The invention also relates to a device for managing image information, which device comprises at least one monitoring module for monitoring a monitored location and a remote recipient unit, the monitoring module comprising a light-sensitive sensor which is arranged to record an image of the monitored location, a calculating unit which is arranged to segment out a distinct region by comparing the recorded image with a reference image and to create an outline shape which represents the edge of the distinct region, and a communication unit which is arranged to transmit data representing the outline shape to the recipient unit; and the recipient unit being arranged to receive said transmitted data, to recreate the outline shape and to display the outline shape visually.

In one embodiment, the monitoring module and the recipient unit interpret according to the same mathematical model. The advantage of this is that information transmitted from the monitoring module can be interpreted by the recipient unit and possibly also recreated, for example, for visual display.

In another embodiment according to the invention, the device comprises a audio device for transmitting audio information from the monitoring module to the monitoring station.

In an embodiment according to the invention, the communication unit comprises a wireless communication device.

The advantages of the device are apparent from the above discussion of the method. The invention also relates to a monitoring module for monitoring a monitored location comprising a light-sensitive sensor, which is arranged to record an image of the monitored location, a calculating unit which is arranged to segment out a distinct region by comparing the recorded image with a reference image and to create an outline shape which represents the edge of the distinct region, and a communication unit which is arranged to transmit data representing the outline shape to a remote recipient unit.

The invention also relates to a computer program product which comprises program code which is stored on a computer-readable medium and which, when loaded into a computer, carries out one or more of the method steps according to any one of claims 1–16.

Further advantages of the monitoring module and the computer program product are apparent from the above.

BRIEF DESCRIPTION OF THE DRAWINGS

In the following, the invention will be described in greater detail with reference to the accompanying schematic drawings, which for the purpose of exemplification show a currently preferred embodiment of the invention.

DESCRIPTION OF A PREFERRED EMBODIMENT

Figure 1:
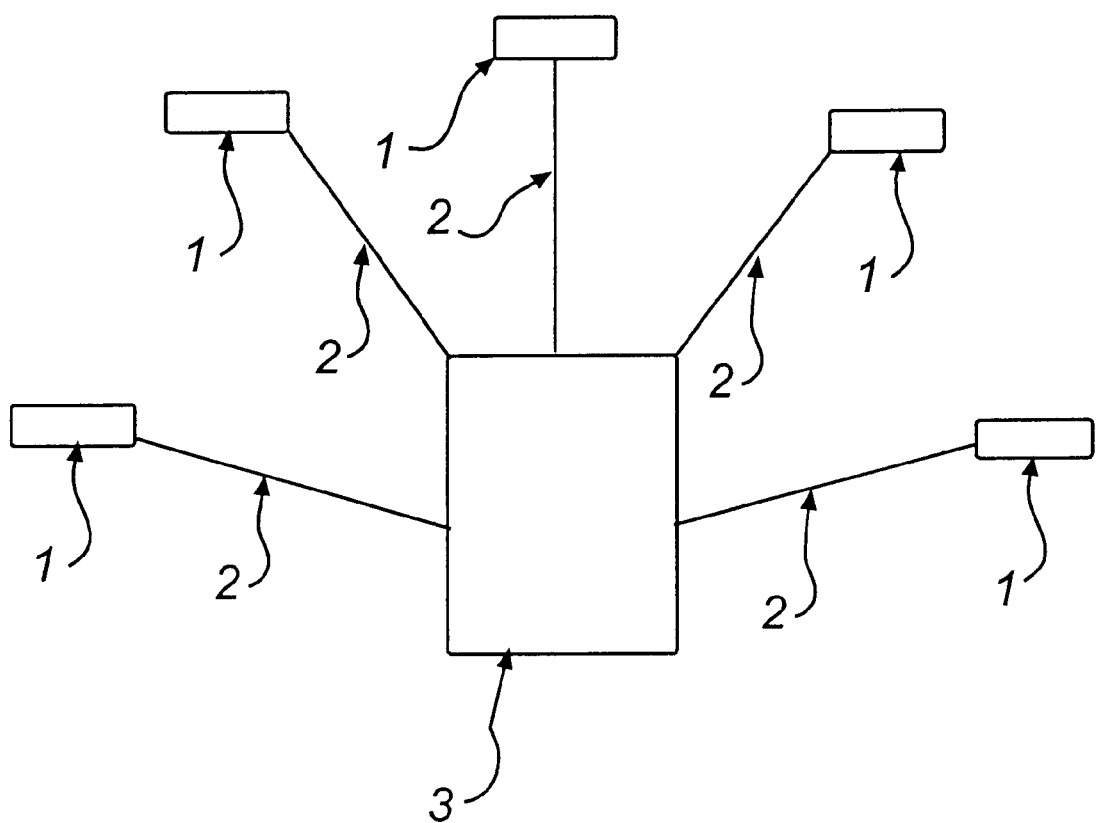
FIG. 1 shows a monitoring system according to an embodiment of the invention.
Figure 11:
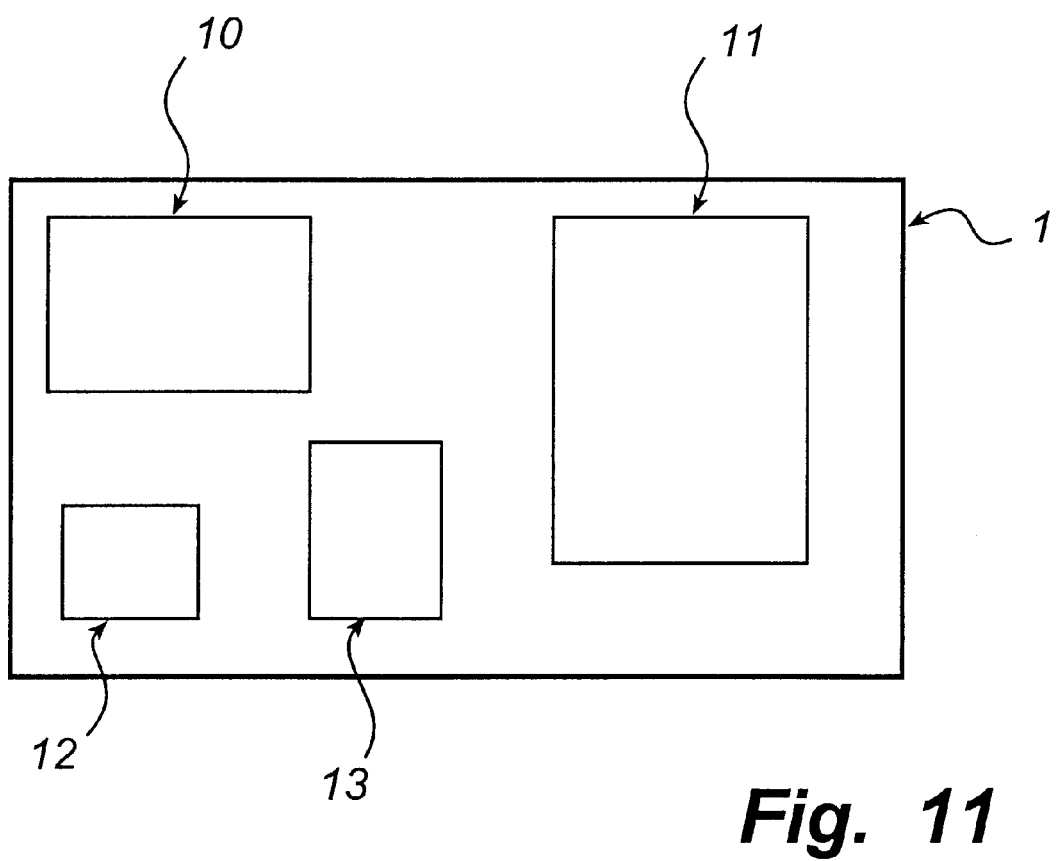
FIG. 11 shows schematically a monitoring module according to the invention.

FIG. 1 shows a monitoring system with a number of monitoring modules 1. FIG. 11 shows schematically a monitoring module 1. The monitoring module 1 comprises a light-sensitive sensor 10 for recording images, a calculating unit 11 for processing image information, a communication unit 12 which is connected via a wireless communication path 2 to a recipient unit 3 and a memory means 13. The recipient unit 3 is in this case arranged at a central station, which has display screens that are monitored by an operator. The monitoring module 1 and the central station with the recipient unit 3 comprise the same mathematical model for processing the information transmitted between them, which means that they interpret the information in the same way. There can also be several recipient units 3 in the monitoring system. The system can be so arranged that different types of alarm go to different recipient units 3.

Figure 8:
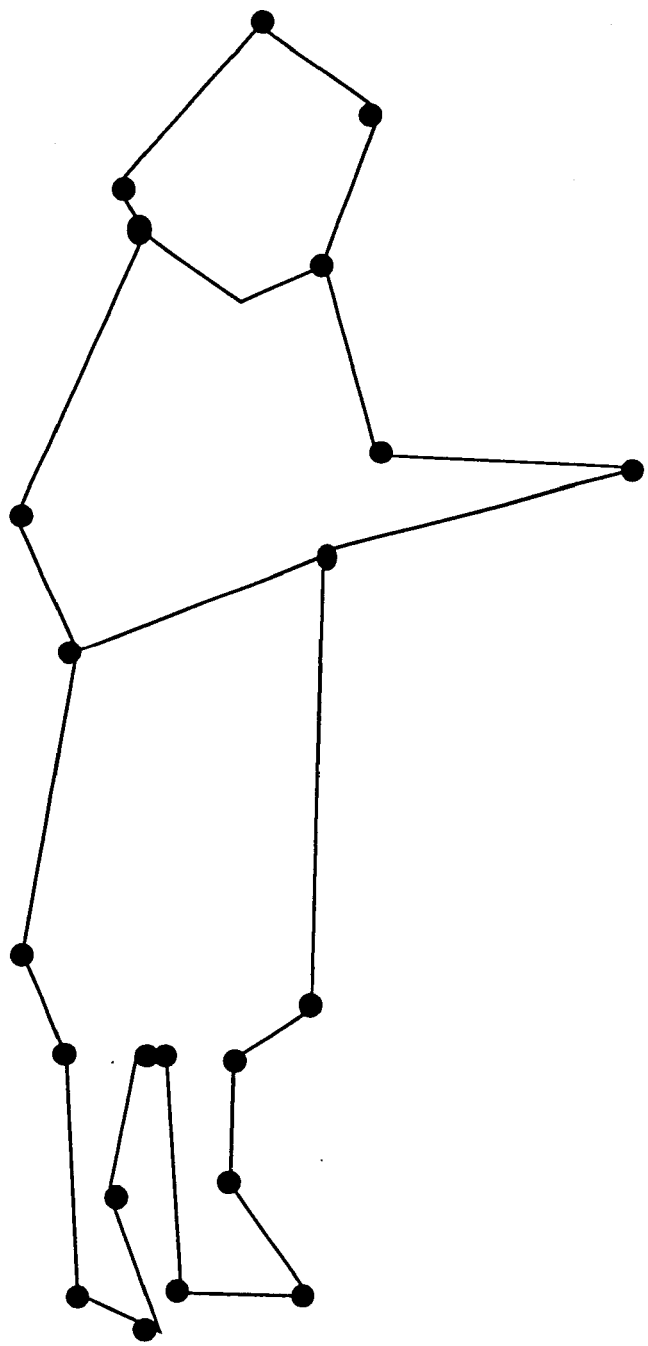
FIG. 8 shows schematically a polygon with line content.
Figure 9:
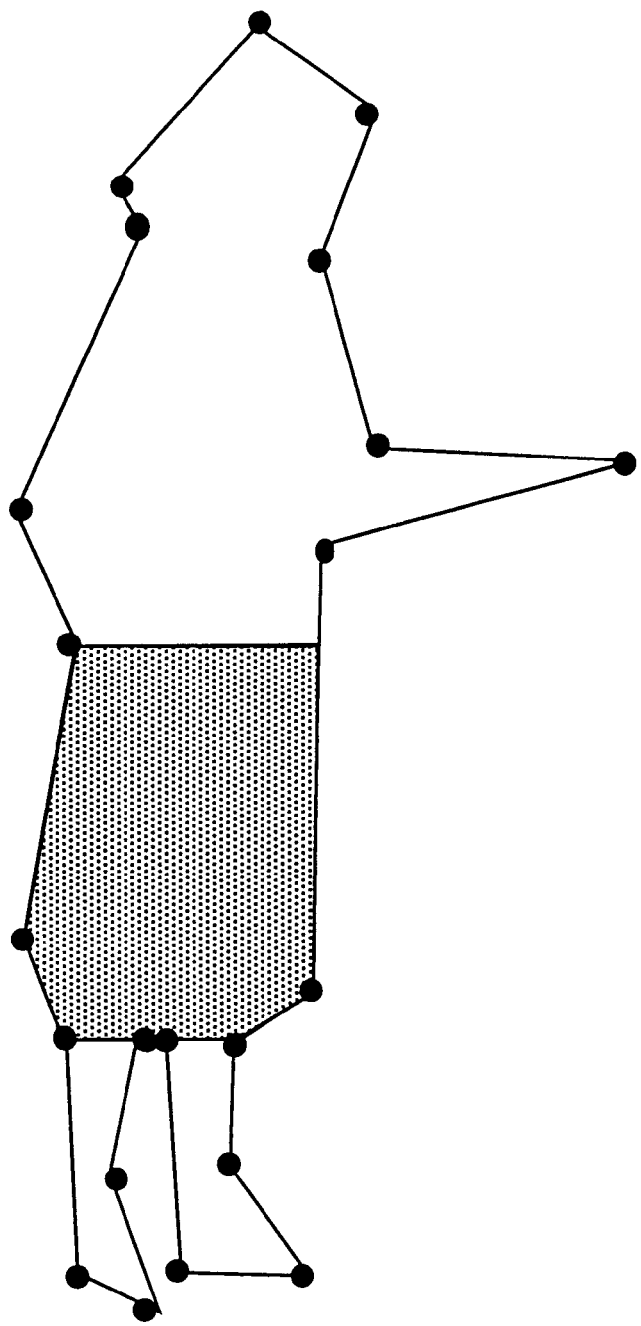
FIG. 9 shows schematically a polygon with partial regions.
Figure 10:
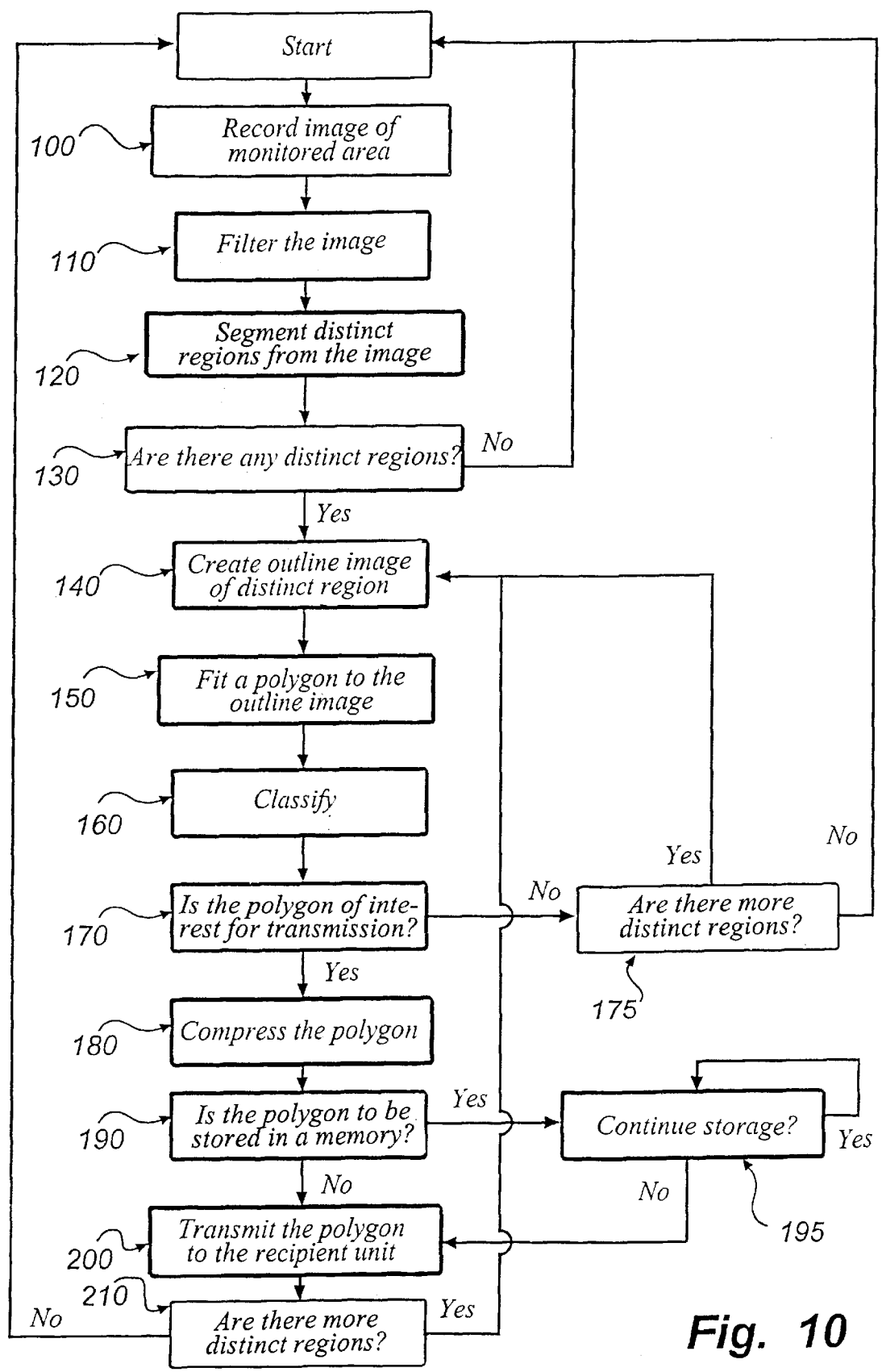
FIG. 10 shows a flow chart for a method according to an embodiment for processing image information.

An embodiment according to the invention will be further described with reference to FIG. 11, a flow chart in FIG. 10, and exemplifying pictures in FIGS. 2 to 9.

Figure 2A:
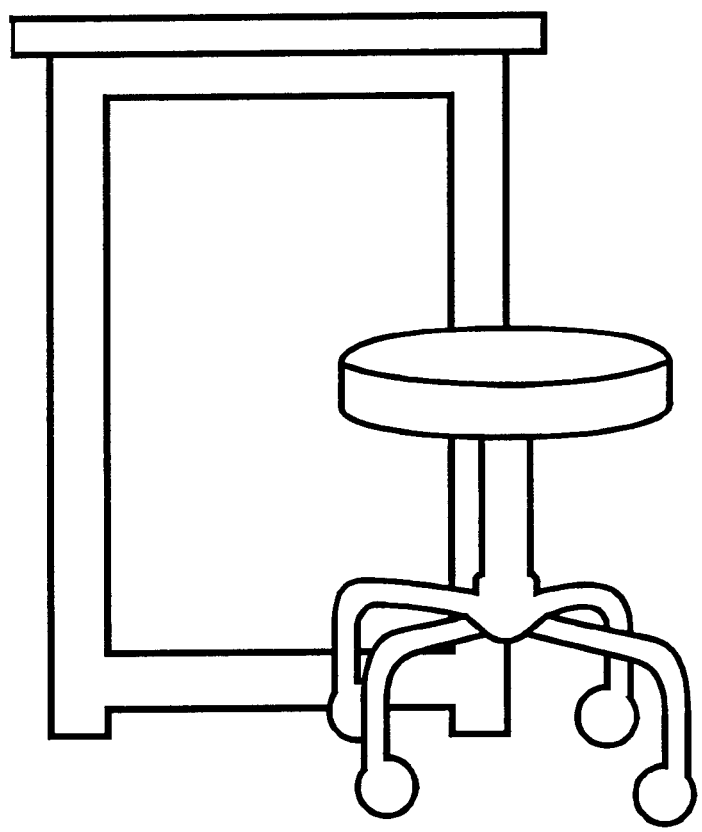
FIG. 2a shows schematically a reference image.
Figure 2B:
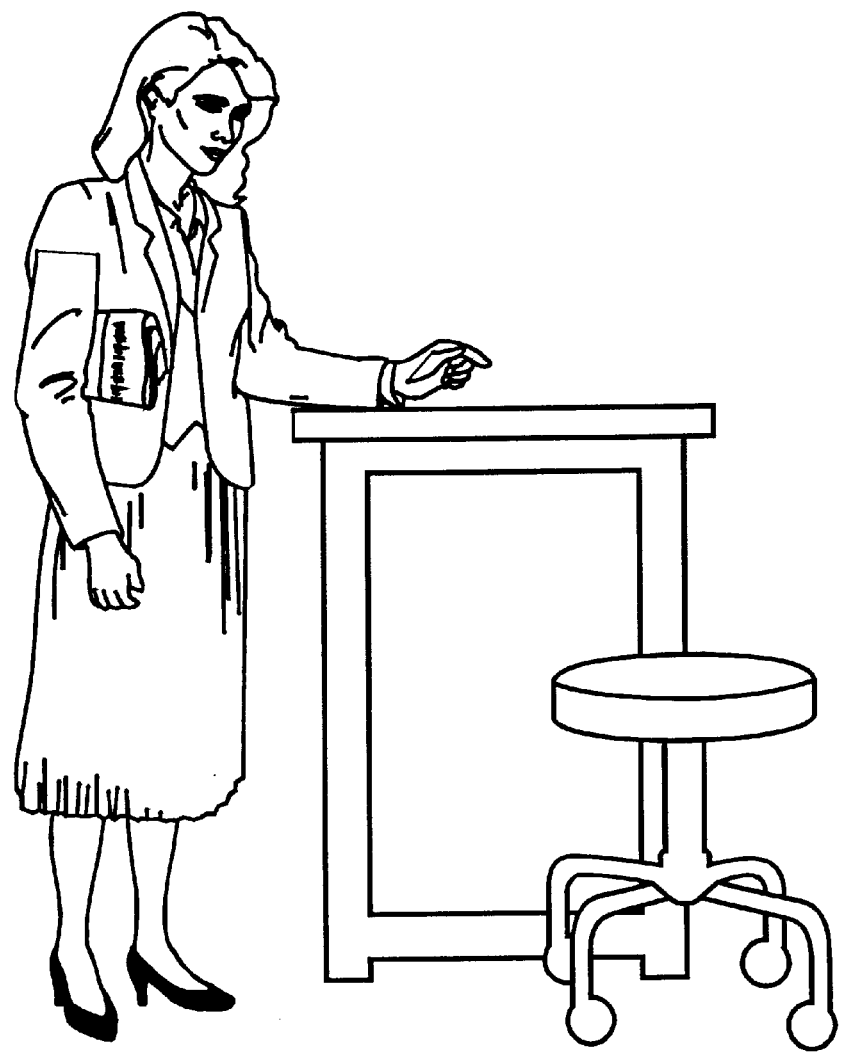
FIG. 2b shows schematically an image recorded by the monitoring module.

FIG. 2a shows a reference image of the monitored location. FIG. 2b shows an image recorded in a recording step 100 by the light-sensitive sensor 10 in the monitoring module 1. In the image there is, among other things, a person. The image is filtered in a filtering step 110. By filtering the image with different filter processes and in this way removing, for example, shadows and noise, the most interesting parts can be emphasized and different monitoring situations are made easier to determine. The filtering of the image can also be carried out on the segmented image, the outline image and/or the outline shape.

The image is then compared with a reference image. This reference image can be created, for example, by averaging or Kalman filtering of a number of previously-recorded images. These can, for example, be background images which are recorded when there is no alarm object in the area.

Figure 3:
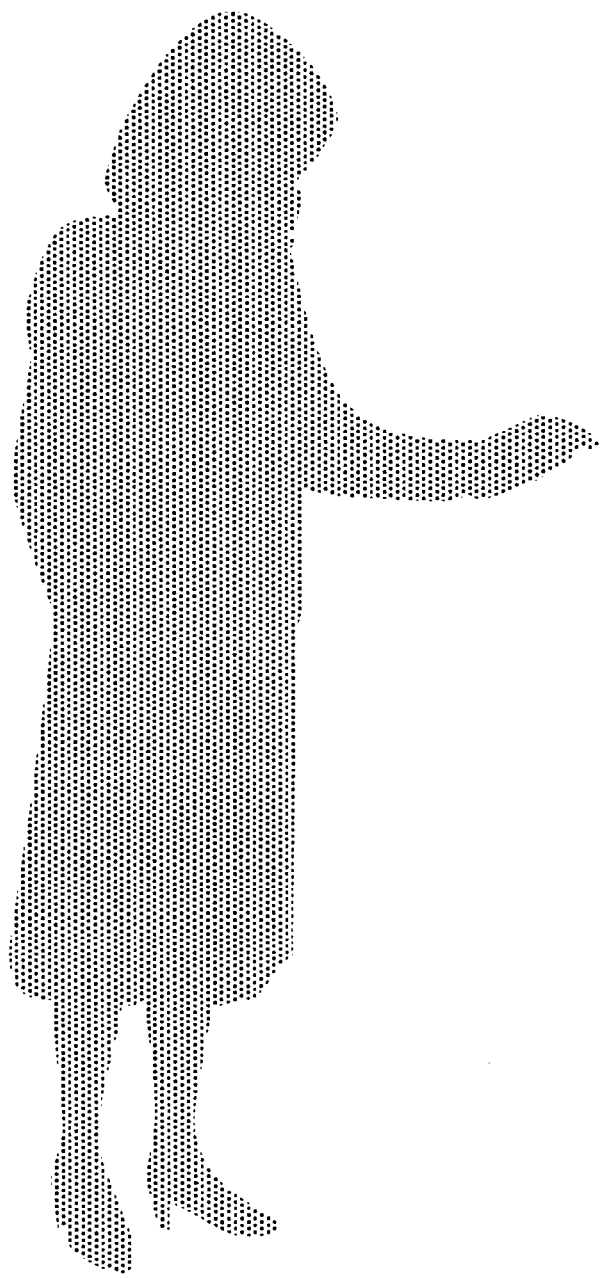
FIG. 3 shows schematically a segmented image with a distinct region.

If an extraneous object is included in a recorded image, a distinct region is segmented out in a segmentation step 120 by the comparison with the reference image. In our case a person has entered the monitored location and has been recorded by the monitoring module 1. The segmentation comprises the following steps. A difference image is created from the image in question and a background image. The background image is recorded when there is no monitored object of interest in the monitored location, that is to say when the monitored location is in an initial position and there are no objects present other than those which should be in the monitored location. Each pixel in the reference image is compared with a threshold value. If the threshold value is exceeded, this becomes a point recorded as foreground. The points recorded as foreground are combined into distinct regions, which is shown in FIG. 3. In this example we have a distinct region 130.

Figure 4:
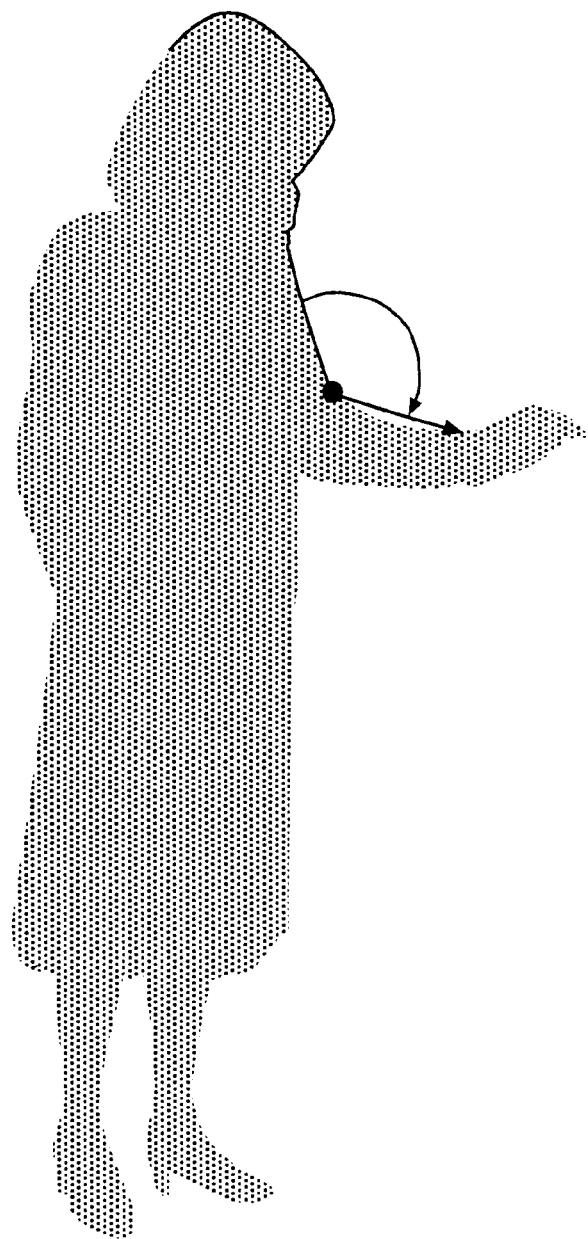
FIG. 4 shows schematically how the edge of the distinct region is traced out.

FIG. 4 shows how the distinct region is traced out along its edge in a processing step 140 by a search function which has a clock-hand algorithm, to create an outline image of the distinct region. The clock-hand algorithm traces along the edge of the distinct region until it reaches the point where it started. In detail, the following takes place. A start point is first looked for on the edge of the distinct region. As long as the start node is not encountered and there are unexplored ways forward, a clock-hand is moved clockwise at a distance of one pixel from the previous position until a new edge point is encountered. If the clock-hand's new position is the start position, then a new unexplored way is looked for. If there is no way forward, the algorithm is to be discontinued. Otherwise the algorithm continues and the unexplored way forward from the start node which was found is marked as explored.

Figure 5:
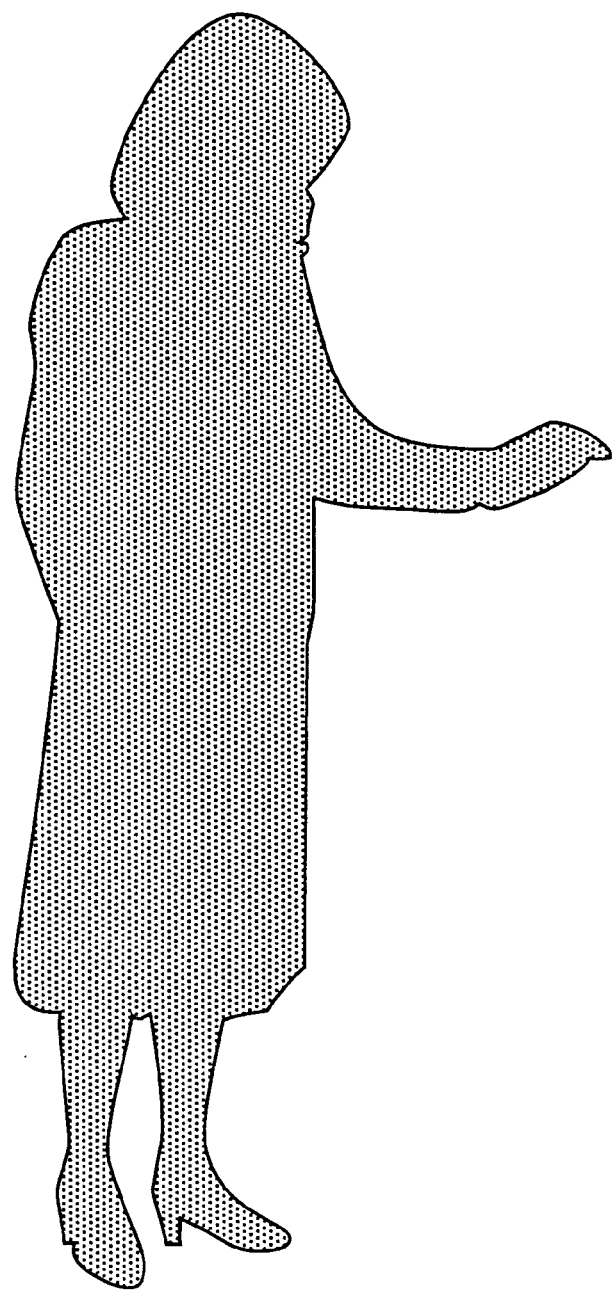
FIG. 5 shows schematically an outline image in which all the edge points for the distinct region are encountered.
Figure 6:
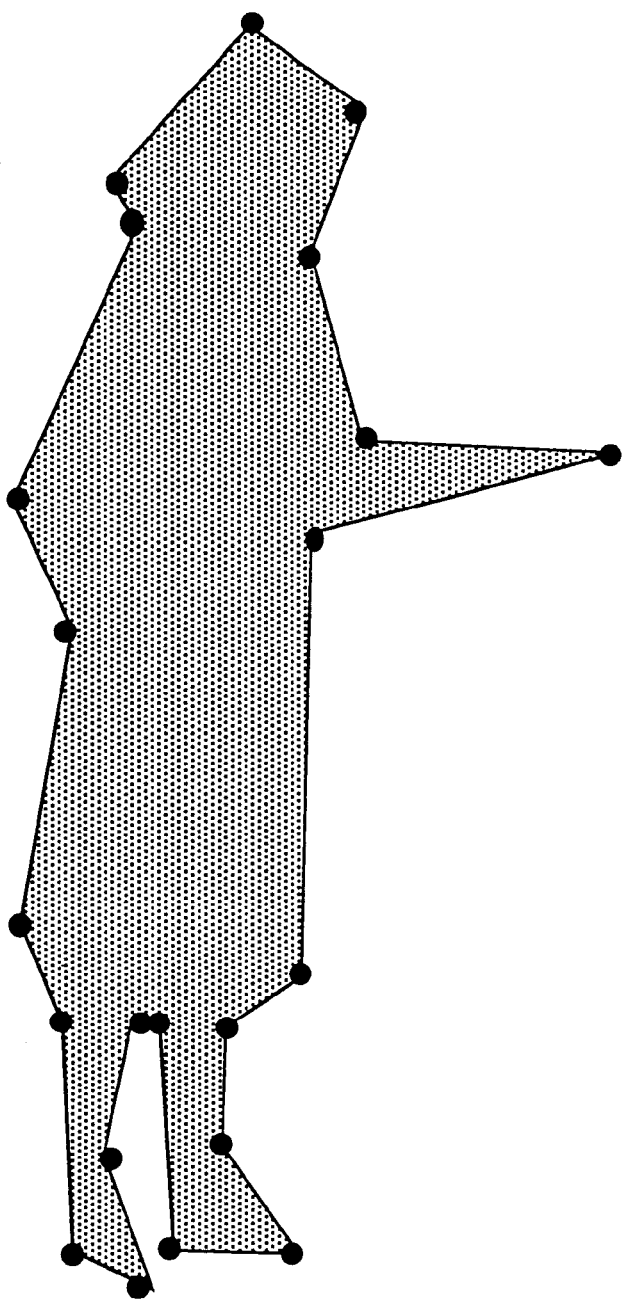
FIG. 6 shows schematically a polygonized image.

FIG. 5 shows the outline image of the distinct region which represents the person. In FIG. 6, in a fitting step 150 an outline shape, which is this case is a polygon, is fitted to the traced-out path. The polygon is fitted using an angle-minimizing function. The angle-minimizing function is as follows. A start point is set on the edge as the most recent point. As long as the end point is not encountered, then the edge is traced out. The angle difference between the tangent vector of the most recent point and the tangent vector of the present position around the edge is calculated. If the angle difference is greater than a particular limit, then this position is saved as a node, and the position is set as the most recent point. The number of points in the polygon can be varied.

Figure 7:
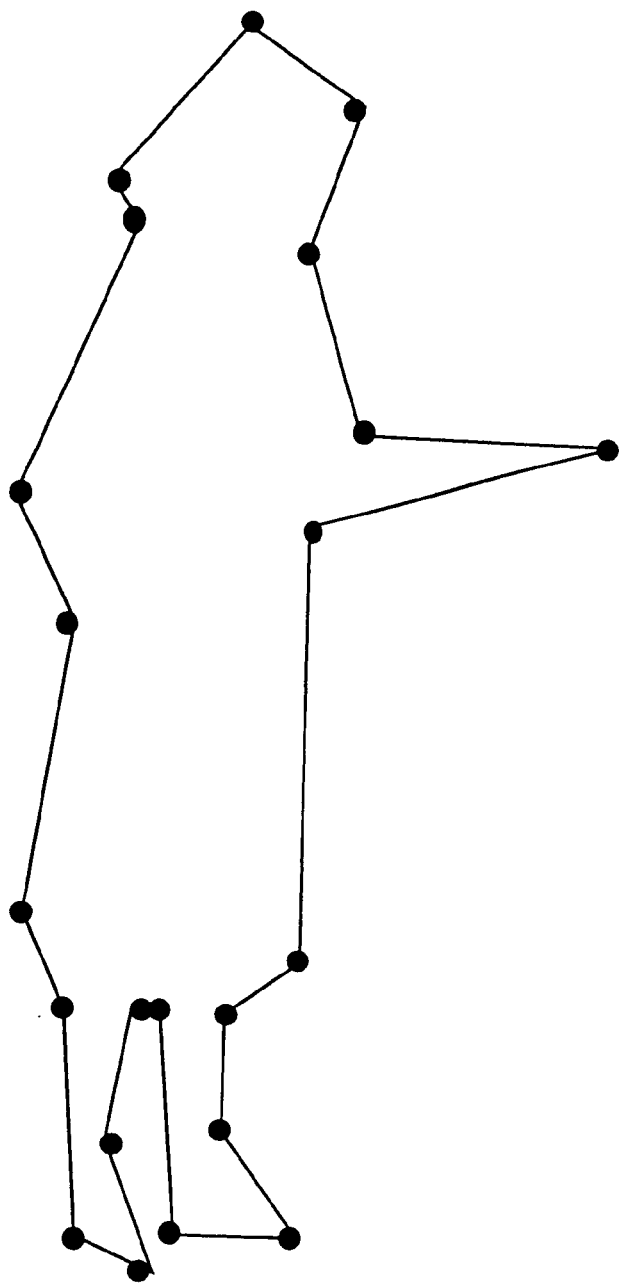
FIG. 7 shows schematically a polygon.

The polygon created is classified in a classification step 160 and it is determined whether it is of interest for transmission or not in a decision step 170. The polygon is classified in this case as person-related. If the result of the classification was that the object should not give rise to an alarm, it is investigated whether there are more distinct regions in an investigation step 175. The criteria for person-resembling classification indicate in this case that the polygon is to be forwarded to the recipient unit 3. The classification step 160 can also be carried out based on the movement history of the detected object. The movement history can be obtained by taking previously recorded segmented distinct regions and matching these with the distinct region in question. If these match to a predetermined degree, it is assumed that they originate from the same object and in this way the direction of movement and speed of the object can be obtained. The classification can also be carried out based on both the movement history of the polygon and on the polygon. The polygon is compressed in a compression step 180 by a Huffman algorithm with incremental steps and is sent in a transmission step 200 to the recipient unit 3. If a fault has arisen in the communication path 2 or in the recipient unit 3, the polygon can first be stored in a memory in a storage step 190, 195 in the monitoring module 1 and can be transmitted in the transmission step 200 when the communication is restored. The polygon is shown in FIG. 7. The polygon is transmitted in parameterized form and as a set of coordinates. In a new investigation step 210, it is investigated whether there are more distinct regions in the recorded image. If this is the case, the procedure is repeated from the processing step 140 also for this distinct region. The polygon which is received by the recipient unit 3 can, for example, be displayed on a display screen to an operator. The polygon can be shown superimposed on a background image. The pattern of movement of the polygon can also be shown. The pattern of movement is calculated from consecutive polygons by said matching. The pattern of movement can be calculated before transmission in the transmission step 200 to the recipient unit 3 or in the recipient unit 3.

In addition, the line content of an object can be sent together with the outline shape. FIG. 8 shows the polygon from FIG. 7 with line content. The main aim of visualizing the line content in the distinct region is to give the visual display of the transmitted information for the object more structure and essential information about the nature of its texture. There are a number of different sets of lines that can be extracted from a texture. Edges can be refined out of the derived texture. The whole area of the object can be made thinner and in this way a kind of "stickman" is obtained. This stickman is quite sensitive to local changes and is therefore not always suitable. In addition, it originates from the outline and not from the texture. The texture can be regarded as a topography. A set of lines can be all the hilltops that can be described purely mathematically as, for example, saddle points and local maximums and minimums, etc. The lines are usually not particularly thin, but often have some form of width. In order to obtain narrow distinct lines, a method can be used that is called "thinning". Thinning "eats away" the edges of the lines without them being "eaten away" completely. Expressed simply, all the lines are made equally narrow (usually 1 pixel in width). In certain cases, the result is not a number of individual lines, but more of a grid. All the partial lines can be regarded as separate lines and can be separated from the other lines. In order to make the visual result as clear as possible, it can sometimes be necessary to weed out the information. For example, if there is a checked shirt, there can be quite a lot of lines clustered together. The weaker lines or some of those that are too close together can then advantageously be removed. Finally, the lines can be represented in a number of different ways. One way is in the form of pixels. Each line is described by the set of pixels (picture elements) it contains. Another way is line sequences. A line sequence is fitted to each line segment. Each line is represented here by a series of straight lines which together approximate to the original line. A further way is in the form of a spline. A spline is fitted to the line in question.

In addition, intensity regions can be sent with both the outline shape and the line content or only with the outline shape in order to make easier a visual evaluation which, for example, takes place in this case when the outline shape is displayed to the operator. A polygon with intensity regions is shown in FIG. 9. The intensity regions are to reproduce as closely as possible the characteristic features of an object. In order to achieve a good segmentation, it is first necessary to define which characteristics of the texture of the object belong together. Examples of such characteristics can be that the whole area is to have the same intensity with only small deviations. Another characteristic can be that the variance of the area is to be less than a particular measurement. A further characteristic can be that the area has a particular set of statistical characteristics such as average value, variance, correlation between adjacent pixels, etc. There are different ways of segmenting the different areas. In order to segment the different areas with the characteristics as mentioned above, a number of different methods can be used. One way is "Split and Merge" which is an algorithm that successively divides an area into smaller areas until the various partial areas fulfil a particular requirement. Thereafter the areas are combined which have the same characteristics. Another way can be quantifying the area at a low bit-depth to give distinct regions. A further way is to plant a seed in the texture and to let this area grow as long as the new pixel conforms with the characteristics of the new area. Pixels are marked as allocated when they are included in an area. When an area cannot grow any larger, then this area is completed and a new seed is planted in another location. It is also possible to have a plurality of seeds growing at the same time in parallel. Another way can be Bayes' classification according to a number of selected region characteristics in the texture.

In order to represent the different regions, a number of different methods can be used. A first method is "Run Length Encoding" (RLE) of the different regions' pixels. The value of the different pixels is which area they belong to. Another method is polygon representation. This method fits a polygon to the area. The polygon can share points with other areas and with the outline of the object. A further method is spline representation which delimits the area by a spline. An advantage is that the amount of data is smaller and the fit is better. A disadvantage is, however, that most spline methods cannot share common points and that the fitting is more processing-intensive.

Once the regions and the lines have been represented, it is only a set of data that is sent via a transmission medium. The only restriction is that both the transmitter and the receiver, which in this case are the monitoring module 1 and the recipient unit 3, must interpret the information in the same way. They must have the same mathematical model of the information.

The operator can also request to have more information about the object. This can be an image of the object which can be sent as a bit-map image. It can also be a sound recording which was made at the monitored location.

Even though a special embodiment of the invention has been described above, it will be obvious to a person skilled in the art that many alternatives, modifications and variations are possible in the light of the above description.

According to the invention, in one embodiment all the produced outline shapes can be transmitted. That is to say there is no classification in the unit. This means that an alarm operator can see at all times all moving events at the monitored location. The low bandwidth which the outline shape occupies enables data about all changes in the recorded image in comparison to a reference image to be transmitted even though the bandwidth is limited.

An example of other modifications which fall within the scope of this invention is that a spline function can be used instead of a polygon. A spline curve is defined mathematically by a number of control points and a function which describes the appearance of the curve between the control points. Normally, the function is fixed and only the control points are used to define the curve. To fit such a curve to an outline image it is necessary to have an initial value, a criterion for where the curve fits the outline and a search strategy to fit the curve to the outline. Normally, the position of the curve in the previous image in a sequence of images is used as the initial value. If starting from scratch, another method must be used, for example by starting with a large circle that is guaranteed to include the outline. The criterion for fitting the curve to the outline can be either the distance to the detected outline or based on the gradient in the image. In the latter case, it is required that the curve should be placed where the gradient is the greatest. The search strategy consists normally of some standard optimization method in order to minimize the criterion in the search strategy. The advantage of a spline representation for optimization is that only the control points need to be used as variables, which leads to increased speed. For more details about spline fitting, see the article "Fast least-square curve fitting using quasi-orthogonal splines", Myron Flickner, James Hafner, Eduardo J. Rodriguez and L. C. Sanz.

In addition, for example, an infrared detector can be used in combination with the sensor. The angle-minimization function can also be replaced by, for example, even length approximation or spline fitting. The even length approximation comprises the steps of setting the first node at the starting point, as long as the final point is not encountered following the edge a certain number of steps, and if the final point is not encountered, placing a node at the present point.

Filtering out can be carried out in several steps of the image processing. The polygon can, for example, also be compressed in the compression step 180 by Huffman coding.

What we claim and desire to secure by Letters Patent is:

1. A method for managing image information in a monitoring system having at least one monitoring module for monitoring a monitored location and a remote recipient unit, said method comprising the steps of:

recording an image of the monitored location using the monitoring module;

in response to a change occurring during image recording as relating to at least one object in said image, segmenting said object to create a distinct region by comparison of the recorded image with a reference image in the monitoring module including by generating, from the recorded image and a reference image of the monitored location, a difference image containing at least a portion of the object;

in response to said segmenting, creating an outline shape in the monitoring module by tracing along edge of the distinct region, said outline shape being a representation of the edge of the distinct region;

transmitting data representing the outline shape to the recipient unit, said outline shape reducing transmission time and bandwidth from transmitting said segmented object represented by the distinct region, or maintaining privacy of the object by not allowing detailed recognition including where the object has a human shape;

recreating the outline shape in the recipient unit using said transmitted data; and displaying the outline shape visually in the recipient unit.

2. The method according to claim 1, in which the step of creating the outline shape comprises the steps of:

creating an outline image of the distinct region; and fitting the outline shape to the outline image.

3. The method according to claim 2, in which the step of creating the outline image comprises the step of following the edge of the distinct region by means of a search function.

4. The method according to claim 1, further comprising the step of classifying the distinct region in the monitoring module based on at least one characteristic belonging to the distinct region, the classification controlling the transmission of said data.

5. The method according to claim 1, further comprising the step of comparing, in the monitoring module, particular characteristics belonging to the distinct region with corresponding characteristics belonging to a segmented region out of at least one previously recorded image, a movement history of the distinct region being recorded if the characteristics conform to the extent that the characteristics are determined to represent the same object.

6. The method according to claim 5, further comprising the step of classifying in the monitoring module the distinct region based on the recorded movement history of the distinct region, the classification controlling the transmission of said data.

7. The method according to claim 5, further comprising the step of classifying the distinct region in the monitoring module based on at least one characteristic belonging to the distinct region, the classification controlling the transmission of said data.

8. The method according to claim 5, in which data representing the movement history is transmitted to the recipient unit together with said data representing the outline shape and is recreated for visual display.

9. The method according to any one of claims 4, 6, 7 or 8, in which said data is only transmitted if the distinct region is classified as human-related.

10. The method according to claim 1, further comprising the step of storing the data which is to be transmitted to the recipient unit in the monitoring module prior to transmission.

11. The method according to claim 1, further comprising the step of transmitting supplementary monitoring information within the distinct region to the recipient unit.

12. The method according to claim 1, further comprising the step of displaying the recreated outline shape on a background image in the recipient unit.

13. The method according to claim 1, in which communication between the monitoring module and the recipient unit is carried out by wireless means.

14. The method according to claim 1, in which the outline shape is represented by a polygon.

15. The method according to claim 14, in which the polygon is represented by a number of points that vary in number.

16. The method according to claim 1, in which the outline shape is represented by a spline function.

17. A computer program product comprising program code which is stored on a computer-readable medium and which, when loaded into a computer, carries out the method steps according to claim 1.

18. A device for managing image information, said device having at least one monitoring module for monitoring a monitored location and a remote recipient unit, the monitoring module comprising:

a light sensitive sensor which is arranged to record an image of the monitored location;

a calculating unit which is arranged, in response to a change occurring during image recording as relating to at least one object in said image, to segment said object to create a distinct region by comparing the recorded image with a reference image including by generating, from the recorded image and a reference image of the monitored location, a difference image containing at least a portion of the object, and, in response said segmenting, to create an outline shape which is a representation of edge of the distinct region by tracing along the edge of the distinct region; and a communication unit which is arranged to transmit data representing the outline shape to the recipient unit, said outline shape reducing transmission time and bandwidth from transmitting said segmented object represented by the distinct region, or maintaining privacy of the object by not allowing detailed recognition including where the object has a human shape;

wherein the recipient unit being arranged to receive said transmitted data, to recreate the outline shape and to display the outline shape visually.

19. The device according to claim 18, in which the calculating unit is further arranged to classify the distinct region based on at least one characteristic belonging to the distinct region, and to control the transmission of said data based on the classification.

20. The device according to claim 18, in which the monitoring module further comprises a memory means, which is arranged to store data.

21. The device according to claim 18, in which the monitoring module and the recipient unit interpret information according to a mathematical model.

22. The device according to claim 18, further comprising an audio device for transmission of audio information from the monitoring module to the monitoring station.

23. The device according to claim 18, in which the communication unit comprises a wireless communication device.

24. The device according to claim 20, wherein the stored data includes data about the at least one characteristic belonging to the distinct region.

25. The device according to claim 20, wherein the stored data includes data that represents the outline shape.

26. A monitoring module for monitoring a monitored location comprising:

a light-sensitive sensor, which is arranged to record an image of the monitored location;

a calculating unit which is arranged, in response to a change occurring during image recording relating to at least one object in the image, to segment said object to create a distinct region by comparing the recorded image with a reference image including by generating, from the recorded image and a reference image of the monitored location, a difference image containing at least a portion of the object and, in response to said segmenting, to create an outline shape which is a representation of edge of the distinct region by tracing along the edge of the distinct region; and a communication unit which is arranged to transmit data which represents the outline shape to a remote recipient unit, said outline shape reducing transmission time and bandwidth from transmitting said segmented object represented by the distinct region, or maintaining privacy of the object by not allowing detailed recognition including where the object has a human shape.

* * * * *